United States Patent
Brown

(10) Patent No.: US 6,903,299 B2
(45) Date of Patent: Jun. 7, 2005

(54) RESISTANCE WELDING TIP ASSEMBLY

(75) Inventor: Ronald C. Brown, Wilmot, NH (US)

(73) Assignee: D. J. Livingston & Company, INc., West Lebanon, NY (US)

( * ) Notice: Subject to any disclaimer, the term of this patent is extended or adjusted under 35 U.S.C. 154(b) by 189 days.

(21) Appl. No.: 10/445,660

(22) Filed: May 27, 2003

(65) Prior Publication Data

US 2004/0238500 A1 Dec. 2, 2004

(51) Int. Cl.$^7$ .............................................. B23K 11/30
(52) U.S. Cl. ..................................... 219/119; 219/117.1
(58) Field of Search ............................... 219/119, 117.1

(56) References Cited

U.S. PATENT DOCUMENTS

| | | | | |
|---|---|---|---|---|
| 4,020,316 A | * | 4/1977 | Schaft et al. | 219/103 |
| 4,623,775 A | * | 11/1986 | Lange | 219/120 |
| 4,762,976 A | * | 8/1988 | Miller et al. | 219/119 |
| 4,920,247 A | * | 4/1990 | Ward et al. | 219/103 |
| 4,947,019 A | * | 8/1990 | Akiyama et al. | 219/119 |
| 6,452,130 B1 | * | 9/2002 | Qian et al. | 219/121.52 |
| 6,762,391 B2 | * | 7/2004 | Wile et al. | 219/56.22 |

* cited by examiner

Primary Examiner—Kiley S. Stoner
Assistant Examiner—Len Tran
(74) Attorney, Agent, or Firm—Gifford, Krass, Groh, Sprinkle, Anderson & Citkowski, P.C.

(57) ABSTRACT

A resistance welding tip assembly having a welding tip support to which a welding tip is secured. A sleeve is constructed of an electrical insulating material, such as ceramic, and the sleeve includes a throughbore along a preset axis. The sleeve is slidably mounted to the welding tip support along the preset axis between an extended position and a retracted position relative to the welding tip support. A compression spring disposed between the welding tip support and the sleeve urges the sleeve towards its extended position. The welding tip extends through the sleeve throughbore and is of the same size and cross-sectional shape as the sleeve. Furthermore, when the sleeve is in its extended position, a free end of the welding tip is recessed within the sleeve throughbore. Conversely, when the sleeve is in its retracted position, the free end of the welding tip is adjacent a free end of the sleeve and accessible for a welding operation. In practice, the sliding movement of the sleeve between its extended and retracted position between sequential welding operations maintains the integrity of the free end of the welding tip by shearing off any flash or mushroom of the welding tip as the sleeve moves from its retracted and to its extended position.

6 Claims, 2 Drawing Sheets

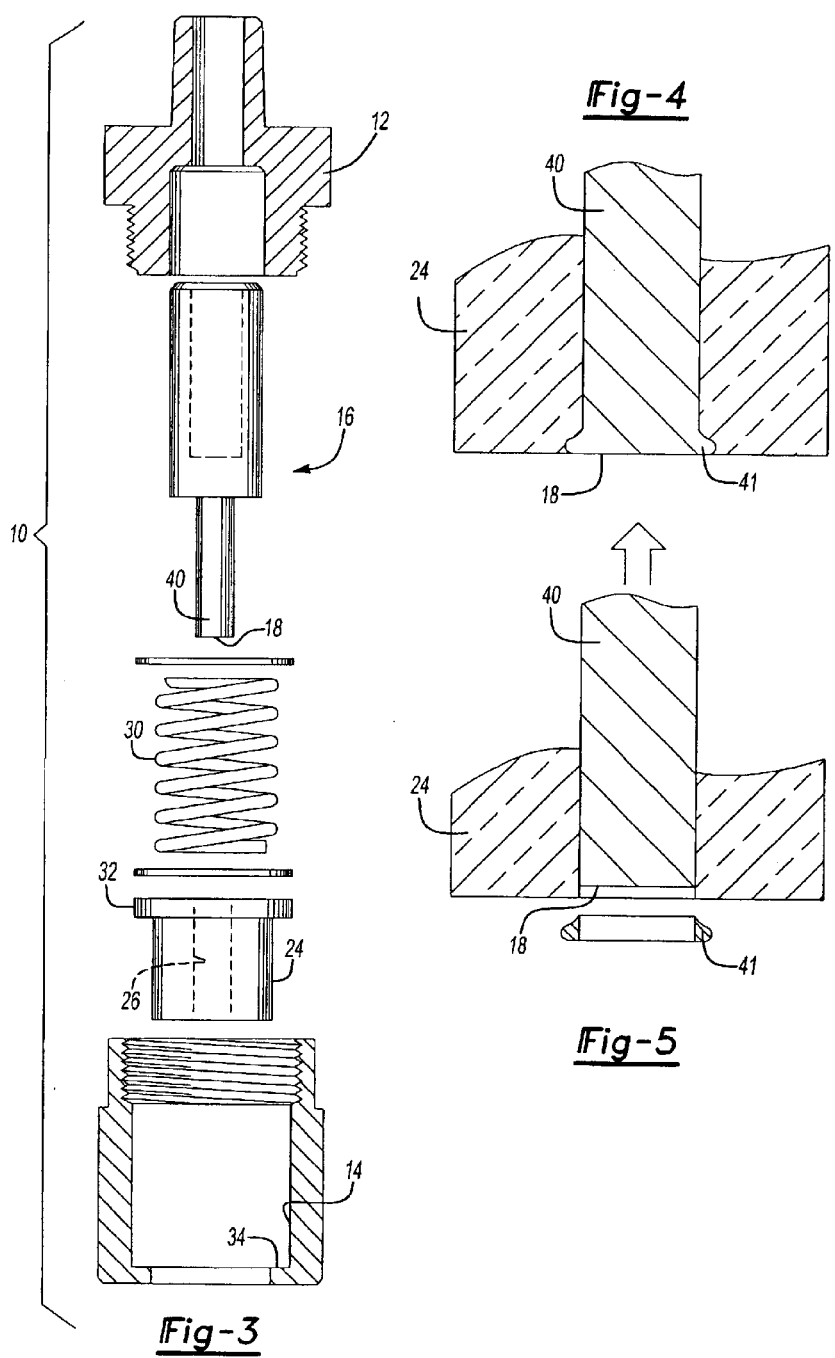

RESISTANCE WELDING TIP ASSEMBLY

BACKGROUND OF THE INVENTION

I. Field of the Invention

The present invention relates generally to welding and, more particularly, to a resistance welding tip assembly.

II. Description of the Prior Art

Resistant welding machines typically comprise a welding jaw having two spaced apart welding tips that are movable relative to each other. During the welding operation, the welding tips are moved together thus sandwiching the work to be welded in between the tips. Pneumatic, hydraulic or electrical actuators are commonly used to create a clamping jaw force between the welding tips and thus on the work.

During a welding operation, a high amperage power source is applied to the welding tips so that the current flows through the welding tips and thus through the workpiece sandwiched in between the welding tips. In doing so, the workpiece becomes heated thus liquefying the workpiece in the area between the welding tips in the desired fashion. Upon cooling, the weld solidifies thus completing the welding operation.

In order to obtain an adequate weld, it is necessary to maintain a relatively high current density between the welding tips during the welding operation. Unless such high current density is obtained during the weld, insufficient melting of the workpiece results and, in turn, results in an inadequate weld. Such inadequate welds are prone to failure in use.

Ideally only the workpiece would melt during the welding operation so that the current density between the welding tips would remain substantially constant during sequential welds. Unfortunately, however, during a welding operation the welding tips themselves become soft from the welding heat and tend to mushroom during the welding operation. The mushrooming of the welding tips increases in magnitude over a series of sequential welds and also increases with increased pressure applied to the welding tips during the welding operation.

As the welding tips mushroom, the effective area of contact between the welding tips and the work also effectively increases. This, in turn, decreases the current density through the workpiece during a welding operation and can result in inadequate welds.

In order to avoid unsatisfactory welds, it has been the previous practice in manufacturing facilities to periodically replace the welding tips after a preset number of welding operations. For example, if the welding tips can be used for 200 welding operations without suffering excessive mushrooming of the type which would result in inadequate welds, the welding tips would be automatically replaced after 200 welds. This previously known procedure, while adequate to prevent unsatisfactory welds, suffers from its own disadvantages.

First, the periodic replacement of the welding tips after a predetermined number of welds results in a shutdown of the manufacturing assembly line for the period of time necessary to replace the welding tips. A still further disadvantage is that the periodic replacement of the welding tips adds to the overall manufacturing cost due to the replace cost of the welding tips themselves.

SUMMARY OF THE PRESENT INVENTION

The present invention provides a resistance welding tip assembly which overcomes all of the above-mentioned disadvantages of the previously known devices.

In brief, the welding tip assembly of the present invention includes a welding tip support on which an elongated welding tip is mounted. A free end of the mounting tip is adapted to engage the workpiece to be welded while a source of electrical power is electrically connected to the welding tip.

The welding tip assembly further includes a sleeve constructed of an electrical insulating material having a throughbore along a preset axis. Preferably, the sleeve is constructed of a ceramic material although other types of materials may alternatively be used.

The sleeve is movably mounted to the welding tip support along the preset axis between an extended position and a retracted position. A compression spring disposed between the sleeve and the welding tip support urges the sleeve towards its extended position.

The welding tip extends through the sleeve throughbore and has substantially the same size and cross-sectional shape as the sleeve throughbore. Furthermore, the sleeve and welding tip are dimensioned so that, with the sleeve in its extended position, the free end of the welding tip is recessed within the sleeve throughbore. Conversely, when the sleeve is urged towards its retracted position, the free end of the welding tip is positioned adjacent, and preferably flush with, the free end of the sleeve and thus accessible for a welding operation.

In practice, the sleeve moves from its extended position, to its retracted position and back to its extended position during each sequential welding operation. The movement of the sleeve from its retracted and to its extended position effectively shears off any mushrooming or flash of the welding tip that may have occurred during the prior weld maintaining a consistent diameter of the welding tip.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which:

FIG. 3 is an exploded view of the preferred embodiment of the invention; and FIGS. 4 and 5 are diagrammatic views illustrating the operation of the preferred embodiment of the invention in exaggeration.

DETAILED DESCRIPTION OF A PREFERRED EMBODIMENT OF THE PRESENT INVENTION

Figure 1:
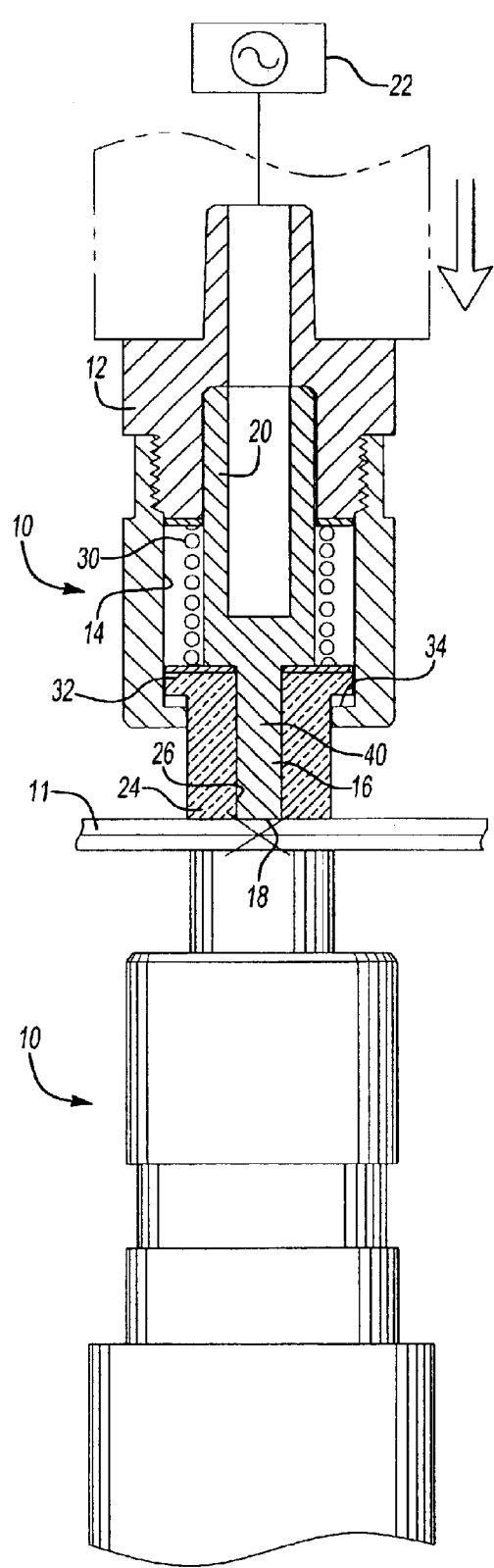
FIG. 1 is a longitudinal partial sectional view of a preferred embodiment of the welding tip assembly of the present invention during a welding operation.

With reference first to FIG. 1, a preferred embodiment of the welding tip assembly 10 of the present invention is shown. It will be appreciated, of course, that welding guns typically comprise two welding tips in an opposed relationship. Furthermore, during a welding operation, the welding tip assemblies 10 are moved together sandwiching the work 11 to be welded in between the welding tips as shown in FIG. 1. Thereafter, current is applied between the welding tips and thus through the work heating the work in the desired fashion.

With reference to FIGS. 1 and 3, the welding tip assembly 10 includes a welding tip support 12 having an interior cylindrical cavity 14. A welding tip 16 is secured to the welding tip support 12 in any conventional fashion so that the welding tip 16 extends coaxially through the cavity 14 and has a free end 18 protruding outwardly from the welding tip support 12. A second end 20 of the welding tip 16 is selectively connected to a source of electrical power 22 (illustrated only diagrammatically in FIG. 1) which supplies the welding current through the welding tip 16.

Figure 2:
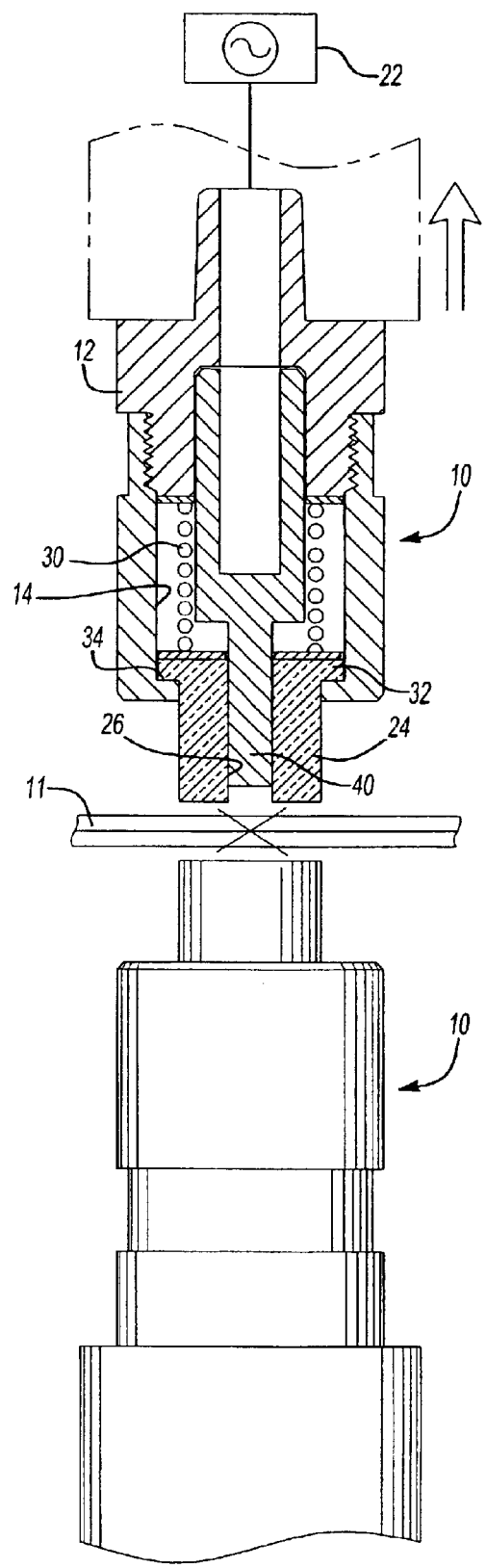
FIG. 2 is a view similar to FIG. 1, but illustrating the welding tip assembly between sequential welding operations.

Referring now to FIGS. 1 and 2, a tubular cylindrical sleeve 24 includes a throughbore 26. The sleeve 24 is axially movably mounted to the welding tip support 12 along the axis of the throughbore 26 between an extended position, illustrated in FIG. 2, and a retracted position, illustrated in FIG. 1. A compression spring 30, furthermore, is sandwiched in between the sleeve 24 and the welding tip support 12 and this spring 30 urges the sleeve 24 towards its extended position (FIG. 2). Preferably, the spring 30 is a helical compression spring.

Although any conventional means may be used to slidably mount the sleeve 24 to the welding tip support 12, in the preferred embodiment of the invention the sleeve 24 includes a radially outwardly extending rim 32 which is positioned within the cavity 14 of the welding tip support 12. An annular abutment surface 34 on the welding tip support 12 cooperates with the rim 32 to limit the outward extension of the sleeve 24 from the welding tip support 12 at its extended position.

The throughbore 26 of the sleeve 24 is of substantially the same size and cross-sectional shape as a free end portion 40 of the welding tip 16. Furthermore, the end portion 40 of the welding tip 16 extends coaxially through the sleeve throughbore 26.

With reference now to FIG. 1, during a welding operation, the free end 18 of the welding tip 16 is compressed against one side of the workpiece 111 to be welded. The compression of the welding tip assembly 10 against the workpiece 11 as shown in FIG. 1 causes the sleeve 24 to move to its retracted position against the force of the compression spring 30. Simultaneously, the free end 18 of the welding tip 16 is then positioned adjacent a free end 46 of the sleeve 24 and against the work 11 to be welded.

With the welding tip assembly positioned as shown in FIG. 1, current is applied through the welding tip 16 and work 44 from the electrical power source 22 in the conventional fashion. In doing so, the free end 18 of the welding tip 16 may experience some slight mushrooming 41 as shown in greatly exaggerated form in FIG. 4.

With reference now to FIGS. 2 and 5, upon completion of the weld, the welding tip assembly 10 is moved away from the work 11. When this occurs, the compression spring 30 returns the sleeve 24 to its extended position. As the sleeve 24 moves from its retracted position and to its extended position, the sleeve 24 effectively shears off any mushrooming 41 of the welding tip 16 as shown in exaggeration in FIG. 5.

Only a small amount of mushrooming occurs at the free end 18 of the welding tip 16 during a single welding operation. Since the sleeve 24 effectively shears off the mushrooming 41 at the welding tip end 18 between each sequential welding operation, the size and shape integrity of the welding tip 16 is maintained throughout the entire useful life of the welding tip 16.

From the foregoing, it can be seen that the present invention provides a welding tip assembly which automatically maintains the shape integrity of the welding tip over multiple welding operations. Having described my invention, however, many modifications thereto will become apparent to those skilled in the art to which it pertains without deviation from the spirit of the invention as defined by the scope of the appended claims.

I claim:

1. A resistance welding tip assembly comprising:

a welding tip support, a sleeve constructed of an electrical insulating material, said sleeve having a throughbore with a preset axis, said sleeve being movably mounted to said welding tip support along said preset axis between an extended position and a retracted position, a spring disposed between said welding tip support and said sleeve which urges said sleeve towards said extended position, an elongated welding tip secured to said welding tip support and extending through said sleeve throughbore, said welding tip having a cross-sectional size and shape substantially the same as said sleeve throughbore, wherein with said sleeve in said extended position, a free end of said welding tip is recessed within said sleeve throughbore and with said sleeve in said retracted position, said free end of said welding tip is positioned adjacent an end of the sleeve throughbore.

2. The invention as defined in claim 1 wherein said sleeve is made of a ceramic material.

3. The invention as defined in claim 1 wherein said sleeve throughbore and said welding tip are both circular in cross-sectional shape.

4. The invention as defined in claim 1 wherein said spring comprises a helical compression spring.

5. The invention as defined in claim 1 wherein said welding tip support includes a cavity, a portion of said sleeve being slidably mounted in said cavity.

6. The invention as defined in claim 5 wherein said sleeve is tubular and cylindrical in shape having a radially outwardly extending rim on said portion of said sleeve, said rim abutting against an annular abutment surface on said welding tip support when said sleeve is in said extended position.

* * * * *